United States Patent [19]

Cuthbert et al.

[11] Patent Number: 5,051,129

[45] Date of Patent: Sep. 24, 1991

[54] MASONRY WATER REPELLENT COMPOSITION

[75] Inventors: Robert L. Cuthbert, Bay City; Edwin P. Plueddemann, Midland, both of Mich.

[73] Assignee: Dow Corning Corporation, Midland, Mich.

[21] Appl. No.: 543,981

[22] Filed: Jun. 25, 1990

[51] Int. Cl.$^5$ ............... B05D 3/02; C08F 283/16; C09K 3/00; B32B 9/04

[52] U.S. Cl. ............... 106/2; 106/287.11; 106/287.12; 106/287.14; 106/287.16; 427/387; 428/540; 428/447; 428/33; 428/22; 525/477; 525/479

[58] Field of Search ............... 106/2, 287.11, 287.12, 106/287.14, 287.16; 427/387; 428/540, 447, 33, 22; 525/477, 479

[56] References Cited

U.S. PATENT DOCUMENTS

| | | | |
|---|---|---|---|
| 3,022,196 | 2/1962 | Jenkins et al. | 106/287.11 |
| 3,772,065 | 11/1973 | Seiler | 117/123 |
| 3,849,357 | 11/1974 | Wolf | 260/29.6 |
| 3,879,206 | 4/1975 | Nestler et al. | 106/12 |
| 3,914,476 | 10/1975 | Nitzsche et al. | 427/337 |
| 3,955,985 | 5/1976 | Bosch et al. | 106/2 |
| 3,956,570 | 5/1976 | Bosch et al. | 428/446 |
| 4,002,800 | 1/1977 | Nestler et al. | 428/447 |
| 4,073,972 | 2/1978 | Nestler et al. | 427/136 |
| 4,076,868 | 2/1978 | Roth et al. | 427/348 |
| 4,102,703 | 7/1978 | Tully | 106/287.14 |
| 4,209,432 | 1/1980 | Roth | 260/29.2 |
| 4,273,813 | 6/1981 | Meddaugh | 427/387 |
| 4,342,796 | 8/1982 | Brown et al. | 427/136 |
| 4,352,894 | 10/1982 | Schmidt | 521/91 |
| 4,413,102 | 11/1983 | Tanaka | 525/453 |
| 4,433,013 | 2/1984 | Puhringer | 427/337 |
| 4,478,911 | 10/1984 | Price . | |
| 4,486,476 | 12/1984 | Fritsch | 427/387 |
| 4,631,207 | 12/1986 | Price | 427/387 |
| B14,648,904 | 12/1988 | DePasquale et al. | 106/2 |
| 4,648,904 | 3/1987 | DePasquale et al. | 106/2 |
| 4,717,599 | 1/1988 | Merrill | 427/387 |
| 4,741,773 | 5/1988 | Kuroda et al. | 106/2 |
| 4,753,977 | 6/1988 | Merrill . | |
| 4,753,977 | 11/1988 | Hodson | 427/387 |
| 4,846,886 | 11/1989 | Fey | 106/2 |
| 4,874,431 | 10/1989 | Fey et al. | 106/2 |
| 4,877,654 | 10/1989 | Wilson | 106/2 |
| 4,889,747 | 12/1989 | Wilson | 427/221 |

*Primary Examiner*—William R. Dixon, Jr.
*Assistant Examiner*—C. Melissa Bonner
*Attorney, Agent, or Firm*—Jim L. DeCesare

[57] ABSTRACT

A masonry water repellent composition for treating surfaces which is an aqueous solution of a water soluble silane coupling agent and an alkyltrialkoxysilane. The alkyltrialkoxysilane is either an alkyltrialkoxysilanes with $C_1$ to $C_6$ alkyl groups on silicon or a blend of alkyltrialkoxysilanes each with $C_1$ to $C_6$ alkyl groups on silicon. A treatment method is also disclosed.

18 Claims, No Drawings

MASONRY WATER REPELLENT COMPOSITION

BACKGROUND OF THE INVENTION

This invention relates to a masonry water repellent composition which is in the form of an aqueous solution containing a alkyltrialkoxysilane and a water soluble silane coupling agent. The aqueous solution is applied to the surfaces to be treated and the aqueous solution contains a certain predetermined mole ratio of the alkyltrialkoxysilane and water soluble silane coupling agent.

Water resistance is an important factor in concrete and masonry construction. This is because moisture movement in concrete causes or contributes to problems such as expansion, shrinkage, cracking, staining, mildew, lowered resistance to freezing and thawing, chemical attack, corrosion of reinforcing steel, and damage to structures from settling. Because of these problems, various techniques have been used to render concrete water resistant. Some of these methods include the surface treatment of concrete structures with water repellents. Water repellents that have been used in the past are oils, waxes, soaps, resins and organosilicon compounds, and they have been applied to the masonry surfaces by brush, roller, air spray, or airless spray techniques. One of the most prevalent category of repellent that has been sued is organosilicon compounds, and such compounds in organic solvents have been found to be useful for brick, concrete, stucco, or terrazo surfaces.

It is not new in the art to employ organosilicon compounds for the treatment of masonry surfaces in order to render such surfaces water repellent. For example, in U.S. Pat. No. 3,772,065, issued Nov. 13, 1973, there is disclosed an impregnant which is an alcohol or hydrocarbon solution of alkyltrialkoxysilanes or oligomers thereof. In U.S. Pat. No. 3,849,357, issued Nov. 19, 1974, a composition is described which is a mixture of a water base paint, and the reaction product of an alkyltrialkoxysilane, and alkylorthosilicate, and water. U.S. Pat. Nos. 3,389,206, issued Apr. 22, 1975, and 4,002,800, issued Jan. 11, 1977, there is disclosed a solution containing an alcohol or hydrocarbon solvent, an alkyltrialkoxysilane, and an additive. The additive is either an organofunctional silane such as aminopropyltriethoxysilane or an alcoholate such as butyl titanate. U.S. Pat. No. 3,914,476, issued Oct. 21, 1975, refers to an aqueous solutions containing an alkali metal organosiliconate, and an aqueous soluble carbonate or bicarbonate. In U.S. Pat. No. 3,955,985, issued May 11, 1976, an aqueous solution is described containing an alkali metal organosiliconate, a miscible alcohol or ketone, and an organic complexing or chelating agent such as nitrilotriacetic acid.

U.S. Pat. No. 3,956,5709, issued May 11, 1976, applies an aqueous solution of an alkali metal propylsiliconate. Surfaces are contacted with water followed by treatment with a mixture of calcium hydroxide and butyltrimethoxysilane in ethyl alcohol in U.S. Pat. No. 4,073,972, issued Feb. 14, 1978. In U.S. Pat. No. 4,076,868, issued Feb. 28, 1978, there is applied a solvent solution thickened with a filler, and containing either (i) a polysiloxane having a viscosity less than 1000 cs, (ii) an alkyltrialkoxysilane, or (iii) an alkali metal hydrocarbon siliconate. U.S. Pat. No. 4,102,703, issued July 25, 1978, forms a stable suspension of hydrophobed metal oxides in ethylene glycol, and applies the suspension to masonry. Hydrophobing is accomplished with either (i) organohalosilanes, (ii) organosilylamines, (iii) cyclic organosilazanes, (iv) organocyclosiloxanes, (v) polyorganosiloxanes, (vi) alkylhydrogen silicone oils, or (vii) hydroxy endblocked polyorganosiloxanes.

In U.S. Pat. No. 4,209,432, issued June 24, 1980, the patentee applies a solvent solution containing a filler such as fume silica, and containing either (i) an organosiloxane having more than ten silicon atoms per molecule, (ii) an alkyltrialkoxysilane, (iii) the reaction product of a silane and ethylene glycol, or (iv) an alkali metal hydrocarbon siliconate. U.S. Pat. No. 4,273,813, issued June 16, 1981, employs a coating of an emulsion of an anionically stabilized hydroxy endblocked polydiorganosiloxane, amorphous silica, and an organic tin salt. In U.S. Pat. No. 4,342,796, issued Aug. 3, 1982, the patentee dries the surface to be treated applies an alkyltrialkoxysilane to the dried surface, allows the silane to migrate into the surface, and applies water to the treated surface. U.S. Pat. No. 4,352,894, issued Oct. 5, 1982, applies an aqueous solution of an alkylsilanol prepared from propyltrimethoxysilane. A coating of a moisture curable urethane resin and an alkylpolysiloxane or hydroxyalkyl polysiloxane such as 2-ethyl-hexyl polysiloxane, stearyl polysiloxane, or hydroxyethyl polysiloxane, is disclosed in U.S. Pat. No. 4,413,102, issued Nov. 1, 1982. In U.S. Pat. No. 4,433,013, issued Feb. 21, 1984, there is applied an emulsion of an alkytrialkoxysilane including a deactivatable surfactant such as a fatty acid ester or silica ester. After the emulsion is applied, the surfactant is deactivated with water containing an alkaline or acid substance. U.S. Pat. No. 4,478,911, issued Oct. 23, 1984, relates to a coating which includes an alkyltrialkoxysilane, water, an organic solvent, and a catalyst such as an organic amine. In U.S. Pat. No. 4,486,476, issued Dec. 4, 1984, the patentee impregnates with a water immiscible solvent such as naphtha containing a mixture of a methyl-ethoxysiloxane having an ethoxy content of 12 percent and a methyl-ethoxysiloxane having an ethoxy content of 43 percent.

U.S. Pat. No. 4,631,207, issued Dec. 23, 1986, employs a solvent such as a glycol ether containing the reaction product of octamethylcyclotetrasiloxane and N-(2-aminoethyl)-3-aminopropyl dimethoxy-methylsilane. Reexamined U.S. Pat. No. B1 4,648,904, issued Mar. 10, 1987, is direct to an emulsion of an alkyltrialkoxysilane, an emulsifier having a HLB value of 2-20, and water. A solution containing an alkylalkoxy polysiloxane resin is applied to masonry in U.S. Pat. No. 4,717,599, issued Jan. 5, 1988. An oily composition or emulsion is disclosed in U.S. Pat. No. 4,741,773, issued May 3, 1988, containing a mixture of a silicone oil with either a nonvolatile paraffinic oil such as turbine oil or a nonvolatile low molecular weight hydrocarbon resin such as polybutene. In U.S. Pat. No. 4,753,977, issued June 28, 1988, the reacting composition includes an organopolysiloxane resin, an alkylalkoxy polysiloxane resin, and a condensation catalyst. A sealer including a hydroxysubstituted polyorganosiloxane and a mixture containing (i) an aromatic solvent such as toluene, (ii) a chlorinated solvent such as trichloroethane, and (iii) an aliphatic solvent such as heptane, is taught in U.S. Pat. No. 4,786,531, issued Nov. 22, 1981.

In U.S. Pat. No. 4,846,886, issued July 11, 1989, and in U.S. Pat. No. 4,874,431, issued Oct. 17, 1989, the patentees apply a combination of (i) a carrier such as an alcohol, glycol ether, or mineral spirits, (ii) a metal salt catalyst, (iii) an alkylalkoxysilane, and (iv) a beading agent such as a fluorosilicone fluid, a polydimethylsiloxane fluid, a room temperature curable silicone rubber, an amine salt functional siloxane copolymer, or trimethylsilyl endcapped polysilicate. A buffered aqueous silane emulsion is disclosed in U.S. Pat. No. 4,877,654, issued Oct. 31, 1989, and U.S. Pat. No. 4,889,747, issued Dec. 26, 1989, containing a hydrolyzable silane, an emulsifier with an HLB value of 1.5–20, water, and a buffering agent.

Of particular relevance to the present invention are U.S. Pat. Nos. 3,879,206, and 4,002,800, noted above, each of which teach an alkyltrialkoxysilane such as butyltrimethoxysilane in combination with an additive such as aminoethylaminopropyltriethoxysilane. However, the combination is applied in a solvent such as ethanol rather than in the form of an aqueous solution as in the present invention. While U.S. Pat. No. 4,478,911, also noted above, includes an alkyltrialkoxysilane combined with an amine, the amine is an organic amine rather than an aminofunctional silane as in the present invention. Both U.S. Pat. Nos. 4,846,886, and 4,874,431, noted previously, teach an alkylalkoxysilane and a beading agent which can be a material such as an aminofunctional silane of the formula $H_2HCH_2CH_2NH(CH_2)_3SI(OMe)_3$, however, the combination is applied in a carrier other than water such as an alcohol, glycol ether, or mineral spirits, and no aqueous solution is formed as in the present invention.

Thus, there are significant differences between what it taught in accordance with the concept of the present invention and what is disclosed in the prior art as evidenced by the several patents noted and discussed above.

SUMMARY OF THE INVENTION

This invention is directed to a composition which is an aqueous solution of a water soluble silane coupling agent and an alkyltrialkoxysilane, wherein the alkyltrialkoxysilane is selected from the group consisting of alkyltrialkoxysilanes with $C_1$ to $C_6$ alkyl groups on silicon and a blend of alkyltrialkoxysilanes each with $C_1$ to $C_6$ alkyl groups on silicon.

In the most preferred embodiment of the invention, it has been found that the alkyltrialkoxysilane and the silane coupling agent should be present in the aqueous solution in the mole ratio of between about 0.5:1 to about 3.0:1 preferably 1.5:1.0 to about 2.0:1.0, in order to provide stable solutions. Aqueous solutions containing the alkyltrialkoxysilane and the silane coupling agent in mole ratios substantially beyond the range noted above are not entirely satisfactory, and in fact have been found to form gels.

The alkyltrialkoxysilane and the silane coupling agent are also preferably present in the aqueous solution at a level of about ten to about forty percent by weight based on the weight of the aqueous solution. More particularly, the alkyltrialkoxysilane and the silane coupling agent are preferably present in the aqueous solutions at a level of about twenty percent by weight based on the weight of the aqueous solution.

The most preferred of the alkyltrialkoxysilanes are either methyltrimethoxysilane and isobutyltrimethoxysilane, and blends thereof. In the case of the silane coupling agent, the most preferred category is the aminofunctional silane coupling agent of which N-(2-aminoethyl)-3-aminopropyltrimethoxysilane is a prime example. Other categories of silane coupling agents may be employed, however, such as quaternary ammonium functional silane coupling agents and other water soluble silane coupling agents.

The invention is further directed to a method of treating a masonry surface in order to render the surface water repellent by applying to the surface to be treated an aqueous solutions of a silane coupling agent and a alkyltrialkoxysilane as defined previously.

The invention is also directed to a method of producing on a porous substrate a water shedding surface coating by applying to the porous substrate a composition in the form of an aqueous solution for producing on the surface of the porous substrate a durable water shedding surface coating.

It is therefore an object of the present invention to chemically fix a water-repelling agent to a porous substrate such as concrete, limestone, and natural stone, in order to improve its resistance to the absorption of water, as well as to impart to the surface thereof the ability to shed surface water.

It is a further object of the present invention to increase the density of a silicone matrix within a porous substrate such as concrete, limestone, and stone, in order to render the substrate water resistant, and at the same time provide it with the property of shedding surface waters.

It is also an object of the present invention to provide a penetrating masonry water repellent composition for porous substrates such as concrete and limestone as well as other non-reactive masonry surfaces in which the repellent not only renders the substrate resistant to water penetration but in addition hinders the ingress of water at the surface.

These and other objects, features, and advantages of the herein described invention will become more apparent from a consideration of the following detailed description thereof.

DETAILED DESCRIPTION OF THE INVENTION

Masonry water repellents including alkylalkoxysilanes impart water repellent properties to such porous substrates as concrete, mortar, and stone. Such repellents function in this fashion because of the fact that they penetrate into the masonry prior to the time that they are transformed into immobile resinous materials. However, due to the penetration of the repellent into the porous substrate, the repellent does not leave behind much of a layer on the porous substrate. As a result the repellent, though effective to render the substrate water resistant, fails nevertheless to provide the substrate with coatings of any significant durability. The compositions disclosed herein are intended to overcome this deficiency and there can be achieved a good degree of water shedding function of the masonry structure because of deposition on the surface of the masonry, in addition to the penetration of the repellent formulation to provide a deep section water barrier to water migration within the substrate itself.

The penetrating masonry water repellents of the present invention have particular application to the highway industry where water resistance is required for bridge decks, roads, and parking garages. In addition, such compositions are applicable especially to the building industry which makes use of masonry materials for walls such as natural stones, which are porous and contain neutral mineral components including, for example, limestone, marble, and granite. These heretofore difficult to treat building materials can be effectively rendered water resistant with the compositions of the present invention. While the highway industry applications of the formulations will be primarily concrete, the building industry applications of the formulations can range from brick, natural stone, as noted above, cinder block, and stucco.

Generally, concrete, brick, and stucco, may be treated with a alkylalkoxysilane rendering the substrate water resistant. The latent alkalinity of such substrates promotes the hydrolysis and condensation of the silane into a resinous silicone matrix being permanently formed and deposited within the interior of the concrete, brick, or stucco substrate. Natural stone, such as limestone, is an exception in that it is relatively neutral and possesses no latent catalytic activity. As a consequence, the silane will not convert to a silicone as rapidly, nor will it affix itself to the calcareous interior surfaces of the substrate. The result is that there is provided very little or no water repellency or resistance to water absorption. This lack of reactivity of limestone is particularly noticeable when limestone aggregate is employed as a constituent in the preparation of concrete. In such instance, water readily penetrates along the interfacial boundaries between the concrete and the coarse limestone aggregate. Since the silane-based repellent does not adhere to the limestone, those portions of the concrete adjacent the aggregate are not rendered water resistant whereas the remainder of the concrete substrate is treated successfully. The water takes the path of least resistance in to the mass of concrete, therefore, migrating along the side or through the aggregate of limestone particles. It is for these types of situations that the compositions of the present invention are particularly useful along with their capacity to shed water at the surface of the substrate.

The masonry water repellent compositions of the present invention including their capability of water shedding have wide application including for example concrete articles such as precast products, blocks, brick, pipe, prestressed products, structural concrete, and highway surfacing; floor and wall tiles, roofing tile, and structural tiles; Portland cement concrete containing coarse limestone aggregate as footings, poured foundations, paving, steps, curbs; structural products; molded, reinforced and prestressed concrete products such as blocks, bricks, pipes, panels, and beams; exterior and interior plaster; stucco; and terrazo.

A major advantage of the repellent compositions of the present invention is that the compositions are capable of being formulated into an aqueous solution which complies with various state and federal regulations regarding volatile organic content (VOC). These regulations generally prohibit a volatile organic content for an architectural coating which is in excess of about four hundred grams per liter. Prior art solvent base alkoxysilanes liberate alcohol which is a volatile organic compound. Volatile Organic Content (VOC) is defined as the amount of volatile organic compounds liberated from a coating as determined by ASTM D3690 and EPA Reference Method 24.

Accordingly, a penetrant can be formulated with the compositions of the present invention which complies with the volatile organic content regulations. Thus, a penetrant in accordance with the present invention will have a volatile organic content generally less than about four hundred grams per liter. In contrast, the equivalent penetrants of the prior art which contain alkoxysilanes such as isobutyltrimethoxysilane have volatile organic contents of the order of magnitude of about 650–700 grams per liter.

Conventional silane coupling agents are well known in the art for bonding resins to fillers and substrates. Typically as part of the process of producing composite materials, reinforcing fillers are treated with silane coupling agents before being introduced into the uncured resin. The silane coupling agents form a coating on the filler, and the coating interacts with the resin, either chemically or through the formation of interpenetrating polymer networks, to form a strong cohesive bond between the resin and filler. A significant benefit of silane coupling agents is the added hydrolytic stability they provide composite materials.

Various conventional highly water soluble silane coupling agents can be used in the present invention. Generally silane coupling agents are of the formula $$A_{(4-n)}SiY_n$$

where A is a monovalent organic radical, Y is a hydrolyzable radical, and n is 1, 2, or 3 (most preferably 3). A can be various types of organic radical including alkyl or aryl radicals. Y radicals hydrolyze in the presence of water and include acetoxy radicals, alkoxy radicals with 1 to 6 carbon atoms, and alkylalkoxy radicals with 2 to 8 carbon atoms.

Specific silane coupling agents within the scope of the present invention include N-(2-aminoethyl)-3-aminopropyltrimethoxysilane, N-(aminoethylaminomethyl)-phenyltrimethoxysilane, N-(2-aminoethyl)-3-aminopropyl-tris(2-ethylhexoxy)-silane, 3-aminopropyltrimethoxysilane, trimethoxysilyl-propyldiethylenetriamine, bis(2-hydroxyethyl)-3-aminopropyltrimethoxysilane, 2-methacryloxyethyldimethyl-[3-trimethoxysilylpropyl] ammonium chloride, methyltrimethoxysilane, ethyltrimethoxysilane, propyltrimethoxysilane, and isobutyltrimethoxysilane.

In particular, the most preferred silane coupling agents include N-(2-aminoethyl)-3-aminopropyltrimethoxysilane, 3-aminopropyltrimethoxysilane, and the quaternary ammonium functional silanes. The most preferred silane coupling agents are commercially available. The other silane coupling agents are available commercially, or their preparation is known in the art.

The following examples illustrate the concepts of the present invention.

EXAMPLE I

Into a container was placed two moles of methyltrimethoxysilane, one mole of N-(2-aminoethyl)-3-aminopropyltrimethoxysilane, and 2.4 moles of water. The contents of the container were mixed and stripped to sixty degrees Centigrade under an aspirator. Ten percent by weight aqueous silane solutions were prepared from the residue.

EXAMPLE II

Into a container was placed a mixture containing isopropyltrimethoxysilane, methyltrimethoxysilane, and N-(2-aminoethyl)-3-aminopropyltrimethoxysilane, in a mole ratio of 1.5:1.5:2.0. The contents of the container and four moles of water were mixed and stripped to sixty degrees Centigrade under an aspirator. Ten percent by weight aqueous silane solutions were prepared from the residue cohydrolyzate oligomer.

EXAMPLE III

The aqueous silane solution in Examples I and II were tested for water repellency. Test pieces of concrete, red brick, gypsum board, and gypsum plaster, were soaked in the ten percent aqueous silane solutions of Examples I and II for thirty minutes and air dried for two to three days to obtain a constant weight. The test pieces were soaked in water at room temperature for one hour, and were weighed in order to determine any increase in weight. The test pieces were air dried for one day and again weighed in order to determine the recovery of the test pieces to the dry state. The results of these tests are set forth in Table I. A tap water control was employed.

TABLE I

| Test Piece | Weight Gain % (After 1 Hour) | Water Retention % (After one day) |
|---|---|---|
| A. Concrete |  |  |
| Control | 5.6 | 2.7 |
| Example I | 0.4 | 0.04 |
| Example II | 0.3 | 0.03 |
| B. Red Brick |  |  |
| Control | 5.4 | 2.0 |
| Example I | 0.34 | 0.00 |
| Example II | 0.28 | 0.00 |
| C. Gypsum Board |  |  |
| Control | 61.3 | 0.00 |
| Example I | 2.6 | 0.00 |
| Example II | 2.4 | 0.00 |
| D. Gypsum Plaster |  |  |
| Control | 30.0 | 0.00 |
| Example I | 6.8 | 0.00 |
| Example II | 4.9 | 0.00 |

EXAMPLE IV

Various additional aqueous silane solutions were prepared in accordance with the procedures of Examples I and II and were tested for water exclusion employing limestone, sandstone, cement block, and concrete block, test pieces. The test solutions contained twenty weight percent of active ingredient. The test pieces were soaked in the twenty percent aqueous silane solution for thirty seconds and air dried for twenty-four hours. The tests pieces were immersed in water in the case of the limestone and sandstone test pieces, and in a fifteen percent salt solution in the case of the cement and concrete block test pieces. The time of immersion varied from twenty-four hours to twenty-one days. The results of these tests are shown in Table II at representative immersions times of six, twelve, and eighteen days, respectively. THOMPSON'S WATER SEAL is included in Table II for comparison purposes. In Table II, the solutions are in a mole ratio of 1:1 unless otherwise indicated. IPTMS denotes isopropyltrimethoxysilane. MTMS denotes methyltrimethoxysilane. AFS indicates the aminofunctional silane coupling agent N-(2-aminoethyl)-3-aminopropyltrimethoxysilane. IBTMS indicates isobutyltrimethoxysilane.

TABLE II

| | Percent Water Exclusion Test Solution 20% Active in Water | | |
|---|---|---|---|
| | Time of Immersion | | |
| Substrate | 6 Days | 12 Days | 18 Days |
| A. Sandstone |  |  |  |
| IPTMS/MTMS/AFS | 75 | 65 | 62 |
| MTMS/AFS 1.5:1 | 74 | 58 | 50 |
| IPTMS/MTMS/AFS 1:1.5:1.5 | 70 | 48 | 40 |
| IBTMS/MTMS/AFS | 60 | 40 | 30 |
| THOMPSON'S | 40 | 10 | 0 |
| B. Cement Block |  |  |  |
| IPTMS/MTMS/AFS 1:1.5:1.5 | 68 | 60 | 55 |
| IBTMS/MTMS/AFS | 73 | 47 | 45 |
| IBTMS/MTMS/AFS | 50 | 42 | 39 |
| THOMPSON'S | 40 | 27 | 25 |
| C. Limestone |  |  |  |
| IPTMS/MTMS/AFS | 85 | 78 | 78 |
| IPT/AFS 1.5:1 | 80 | 70 | 65 |
| MTMS/AFS 1.5:1 | 78 | 70 | 65 |
| IPTMS/MTMS/AFS 1:1.5:1.5 | 65 | 36 | 24 |
| THOMPSON'S | 40 | 25 | 20 |
| D. Concrete Block |  |  |  |
| THOMPSON'S | 63 | 15 | 0 |
| IPTMS/AFS 1.5:1 | 45 | 24 | 20 |
| MTMS/AFS 1.5:1 | 10 | 5 | 0 |
| IPTMS/MTMS/AFS | 10 | 10 | 10 |
| IBTMS/MTMS/AFS .5:1 | 64 | 53 | 50 |

The silane coupling agents employed in accordance with the present invention should be highly water soluble silane coupling agents or hydrolyzed aqueous solutions thereof, as noted hereinbefore, and exemplary of such materials are:

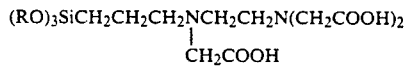

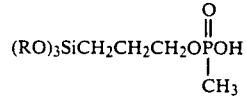

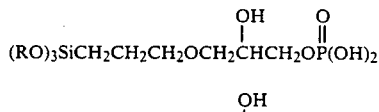

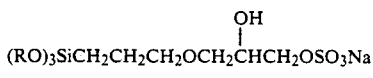

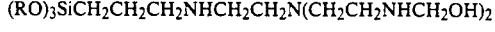

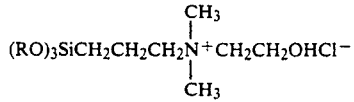

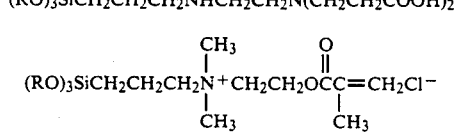

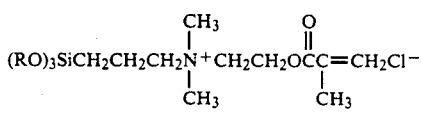

The following additional example illustrates a method of preparing treatment solutions in accordance with the present invention containing such silane coupling agents.

EXAMPLE V

To a 3:1 mole mixture of $CH_3Si(OCH_3)_3$ and

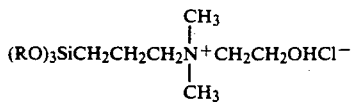

as a fifty percent solution in methanol, was added 3.2 moles of water. After one day, the partial cohydrolyzate was found to be completely soluble in water. Excess methanol was stripped from the product to obtain an oily residue that was also completely soluble in water. The residue generated less than four-hundred parts of methanol by hydrolysis of the methoxy groups per one thousand parts of product. It was found that films deposited from water were water repellent when dried.

It will be apparent from the foregoing that many other variations and modifications may be made in the compounds, compositions, structures, and methods described herein, without departing substantially from the essential features and concepts of the present invention. Accordingly, it should be clearly understood that the forms of the invention described herein are exemplary only and are not intended as limitations on the scope of the present invention as defined in the appended claims.

That which is claimed is:

1. A composition comprising an aqueous solution of a water soluble silane coupling agent and an alkyltrialkoxysilane, the alkyltrialkoxysilane being selected from the group consisting of alkyltrialkoxysilanes with $C_1$ to $C_6$ alkyl groups on silicon and a blend of alkyltrialkoxysilanes each with $C_1$ to $C_6$ alkyl groups on silicon, the volatile organic content of the aqueous solution being less than about four hundred grams per liter, the alkyltrialkoxysilane and the silane coupling agent being present in the aqueous solution in the mole ratio of between about 0.5:1.0 to about 3.0:1.0.

2. The composition of claim 1 in which the alkyltrialkoxysilane and the silane coupling agent are present in the aqueous solution at a level of about ten to about forty percent by weight based on the weight of the aqueous solution.

3. The composition of claim 2 in which the alkyltrialkoxysilane and the silane coupling agent are present in the aqueous solution at a level of about twenty percent by weight based on the weight of the aqueous solution.

4. The composition of claim 1 wherein the silane coupling agent is an aminofunctional silane coupling agent selected from the group consisting of N-(2-aminoethyl)-3-aminopropyltrimethoxysilane, N-(2-aminoethyl)-3-aminopropyltris(2-methoxyethoxy)-silane, 3-aminopropyltrimethoxysilane, trimethoxysilylpropyldiethylenetriamine, aminopropyltriethoxysilane, and bis(2-hydroxyethyl)-3-aminopropyltrimethoxysilane.

5. The composition of claim 4 wherein the silane coupling agent is N-(2-aminoethyl)-3-aminopropyltrimethoxysilane.

6. The composition of claim 1 wherein the alkyltrialkoxysilane is selected from the group consisting of methyltrimethoxysilane and isobutyltrimethoxysilane.

7. The composition of claim 1 wherein the silane coupling agent is a quaternary ammonium functional silane coupling agent selected from the group consisting of 2-methacryloxyethyldimethyl[3-trimethoxysilylpropyl]ammonium chloride and 2-hydroxyethyldimethyl[3-trimethoxysilylpropyl]ammonium chloride.

8. A method of treating a surface in order to render the surface water repellent comprising applying to the surface to be treated an aqueous solution of a water soluble silane coupling agent and an alkyltrialkoxysilane, the alkyltrialkoxysilane being selected from the group consisting of alkyltrialkoxysilanes with $C_1$ to $C_6$ alkyl groups on silicon and a blend of alkyltrialkoxysilanes each with $C_1$ to $C_6$ alkyl groups on silicon, the volatile organic content of the aqueous solution being less than about four hundred grams per liter, the alkyltrialkoxysilane and the silane coupling agent being present in the aqueous solution in the mole ratio of between about 0.5:1.0 to about 3.0:1.0.

9. The method of claim 8 in which the alkyltrialkoxysilane and the silane coupling agent are present in the aqueous solution at a level of about ten to about forty percent by weight based on the weight of the aqueous solution.

10. The method of claim 9 in which the alkyltrialkoxysilane and the silane coupling agent are present in the aqueous solution at a level of about twenty percent by weight based on the weight of the aqueous solution.

11. The method of claim 8 wherein the silane coupling agent is an aminofunctional silane coupling agent selected from the group consisting of N-(2-aminoethyl)-3-aminopropyltrimethoxysilane, 3-aminopropyltrimethoxysilane, trimethoxysilylpropyldiethylenetriamine, aminopropyltriethoxysilane, and bis(2-hydroxyethyl)-3-aminopropyltrimethoxysilane.

12. The method of claim 11 where in the silane coupling agent is N-(2-aminoethyl)-3-aminopropyltrimethoxysilane.

13. The method of claim 8 wherein the alkyltrialkoxysilane is selected from the group consisting of methyltrimethoxysilane and isobutyltrimethoxysilane.

14. The method of claim 8 wherein the silane coupling agent is a quaternary ammonium functional silane coupling agent selected from the group consisting of 2-methacryloxyethyldimethyl [3-trimethoxysilylpropyl]ammonium chloride and 2-hydroxyethyldimethyl[3-trimethoxysilylpropyl]ammonium chloride.

15. The composition of claim 1 in which the alkyltrialkoxysilane is selected from the group consisting of methyltrimethoxysilane and isobutyltrimethoxysilane, and the silane coupling agent is selected from the group consisting of aminofunctional silane coupling agents and quaternary ammonium functional silane coupling agents.

16. The method of claim 8 in which the alkyltrialkoxysilane is selected from the group consisting of methyltrimethoxysilane and isobutyltrimethoxysilane, and the silane coupling agent is selected from the group consisting of aminofunctional silane coupling agents and quaternary ammonium functional silane coupling agents.

17. The composition of claim 1 in which the alkyltrialkoxysilane and the silane coupling agent are present in the aqueous solution in the mole ratio of between about 1.5:1.0 to about 2.0:1.0.

18. The method of claim 8 in which the alkytrialkoxysilane and the silane coupling agent are present in the aqueous solution in the mole ratio of between about 1.5:1.0 to about 2.0:1.0.

* * * * *